United States Patent
Sakakura et al.

(10) Patent No.: US 7,978,704 B2
(45) Date of Patent: Jul. 12, 2011

(54) FRAME BUFFER MONITORING METHOD AND DEVICE

(75) Inventors: Shiuji Sakakura, Kawasaki (JP); Yasuhiro Ooba, Kawasaki (JP); Yukio Suda, Kawasaki (JP); Masayuki Horie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 990 days.

(21) Appl. No.: 11/443,243

(22) Filed: May 31, 2006

(65) Prior Publication Data

US 2007/0189314 A1     Aug. 16, 2007

(30) Foreign Application Priority Data

Feb. 13, 2006 (JP) ................................ 2006-035704

(51) Int. Cl.
*H04L 12/28* (2006.01)

(52) U.S. Cl. ........................................ 370/394; 370/412

(58) Field of Classification Search .................. 370/412, 370/394
See application file for complete search history.

(56) References Cited

U.S. PATENT DOCUMENTS

| 5,404,332 | A | 4/1995 | Sato et al. |
| 6,681,340 | B2* | 1/2004 | Calvignac et al. ............... 714/18 |
| 6,687,255 | B1* | 2/2004 | Holm et al. .................... 370/412 |
| 7,391,723 | B2* | 6/2008 | Collette et al. .................. 370/230 |
| 7,408,878 | B2* | 8/2008 | Evans et al. .................... 370/232 |
| 2005/0262419 | A1* | 11/2005 | Becker et al. .................. 714/758 |

FOREIGN PATENT DOCUMENTS

| JP | 07-105699 | 4/1995 |
| JP | 10-164091 | 6/1998 |

* cited by examiner

*Primary Examiner* — Melanie Jagannathan
(74) *Attorney, Agent, or Firm* — Staas & Halsey LLP

(57) ABSTRACT

In a frame buffer monitoring method and device, information concerning a received frame is extracted, and a monitoring frame added to a start of the frame is written in a FIFO buffer. When the monitoring frame is read from the FIFO buffer, expectation information is generated from the information concerning the frame added to the start of the monitoring frame read, the expectation information is compared with the information concerning the frame included in the frame within the monitoring frame read, and whether or not the expectation information is consistent with the information concerning the frame is determined. As a result of the comparison, when it is determined that the expectation information is not consistent with the information concerning the frame, e.g. bits of an FCS within the frame which is determined to be inconsistent are inverted to be transmitted to a subsequent stage as a discarded frame or the frame is discarded. Also, a write destination address and a read source address for the FIFO buffer are initialized.

18 Claims, 12 Drawing Sheets

FRAME BUFFER MONITORING METHOD AND DEVICE

BACKGROUND OF THE INVENTION

1. Field of the Invention

The present invention relates to a frame buffer monitoring method and device, and in particular to a method and device monitoring whether or not a buffering control is properly performed to frames with a FIFO (First In First Out) buffer or the like.

2. Description of the Related Art

A FIFO buffer is used in various portions shown by hatchings in FIG. 10 such as switches 1_1 within an ATM network 1, routers 2_1 within Ethernet (registered trademark) networks 2, and terminal devices 3_1 within transmission devices 3, being applied for various purposes such as synchronization upon multiplexing frames.

As a frame buffering technology using the FIFO buffer and a monitoring technology thereof, the following prior art examples can be mentioned.

Prior Art Example [1]: FIG. 11

A frame buffer monitoring device 10 shown in FIG. 11 is composed of a parity bit adding portion 400 adding a parity bit to a received frame FR according to a predetermined rule, a FIFO buffer 200 storing the frame FR to which the parity bit is added, a write portion 210 and a read portion 220 respectively writing and reading the frame FR for the FIFO buffer 200, a control counter 310 controlling the write portion 210 and the read portion 220, and a parity bit check portion 500 checking the parity bit included in the frame FR read from the FIFO buffer 200.

As shown in FIG. 11, the control counter 310 in the frame buffer monitoring device 10 provides a write request RQ_W to the write portion 210 when the received frame FR is writable in the FIFO buffer 200.

The write portion 210 having received the write request RQ_W provides a frame write command CMD_W to the FIFO buffer 200 to store the frame FR to which the parity bit is added by the parity bit adding portion 400 in the FIFO buffer 200, and returns a write acknowledgment ACK_W to the control counter 310.

The control counter 310 having received the write acknowledgment ACK_W increments the count. Thus, having recognized that the readable frame FR is stored in the FIFO buffer 200, the control counter 310 provides a read request RQ_R to the read portion 220.

The read portion 220 having received the read request RQ_R provides a frame read command CMD_R to the FIFO buffer 200 to read the frame FR stored in the FIFO buffer 200 to be provided to the parity bit check portion 500, and returns a read acknowledgment ACK_R to the control counter 310.

The control counter 310 having received the read acknowledgment ACK_R decrements the count.

Thus, the control counter 310 performs a buffering control by managing write numbers and read numbers of the frame FR for the FIFO buffer 200.

Also, the parity bit check portion 500 having received the frame FR read from the FIFO buffer 200 checks whether or not the parity bit included in the frame FR maintains a predetermined rule. As a result, when the predetermined rule is not maintained, the parity bit check portion 500 determines that the write or read of the frame FR for the FIFO buffer 200 is not properly performed, and notifies a maintenance person (not shown) of e.g. an alarm "ALARM" or the like shown by a dotted line in FIG. 11.

Thus, by adding the parity bit to the received frame FR and checking the parity bit, the buffering control of the frame FR for the FIFO buffer 200 can be monitored.

Prior Art Example [2]: FIG. 12

The frame buffer monitoring device 10 shown in FIG. 12 is composed of the FIFO buffer 200 storing the frame FR received, the write portion 210 and the read portion 220 respectively writing and reading the frame FR for the FIFO buffer 200, the control counter 310 controlling the write portion 210 and the read portion 220, and an error detection/initialization portion 600 commonly connected to the write portion 210, the read portion 220, and the control counter 310. It is to be noted that the parity bit adding portion 400 and the parity bit check portion 500 shown in the above-mentioned prior art example [1] are not provided.

In the frame buffer monitoring device 10, the control counter 310 performs the buffering control by managing the write numbers and the read numbers of the frame FR for the FIFO portion 200 in the same way as the above-mentioned prior art example [1].

On the other hand, the control counter 310, different from the prior art example [1] mentioned above, notifies an unread count CNT_UR to the error detection/initialization portion 600, i.e. the number of frames FR readable stored in the FIFO buffer 200 every time the frame FR for the FIFO buffer 200 is written or read.

Also, the write portion 210 and the read portion 220 respectively return the write acknowledgment ACK_W and the read acknowledgment ACK_R to both of the control counter 310 and the error detection/initialization portion 600 concurrently.

The error detection/initialization portion 600 having received the write acknowledgment ACK_W, the read acknowledgment ACK_R, and the unread count CNT_UR compares them with one another to determine whether or not there is an error, i.e. whether or not the write numbers and read numbers of the frame FR, and the unread count CNT_UR for the FIFO buffer 200 satisfy a proper relationship of "the unread count CNT_UR"="write numbers"−"read numbers".

As a result, when an error is detected, the error detection/initialization portion 600 provides an initialization indication IND_INIT for initializing a write destination address and a read source address to the write portion 210 and the read portion 220 and for initializing the control counter 310.

The write portion 210, the read portion 220 and the control counter 310 having received the initialization indication IND_INIT respectively and actually perform corresponding initialization processing.

Thus, by determining the relationship between the write numbers, the read numbers of the frame FR, and the unread count CNT_UR for the FIFO buffer 200, it becomes possible to monitor the buffering control of the frame FR for the FIFO buffer 200, and specifically an address control (see e.g. patent document 1).

As a reference example, a frame buffer monitoring method can be mentioned which determines whether or not each ATM switch discards a received cell based on a congestion state, i.e. whether or not the cell is stored in the FIFO buffer by writing the congestion state in the frame (cell in this example) to be mutually notified between the ATM switches, and which enables a buffering control of the cell for the FIFO buffer and its monitoring (see e.g. patent document 2).

[Patent document 1] Japanese Patent Application Laid-open No. 7-105699

[Patent document 2] Japanese Patent Application Laid-open No. 10-164091

In the above-mentioned prior art example [1], a data error itself within a frame can be detected for example per byte by checking a parity bit added to the frame. However, it is very hard to accurately detect a control error upon writing or reading the frame for the FIFO buffer.

Also, in the above-mentioned prior art example [2], an address control error of the write destination or the read source of the frame can be detected by determining the relationship between the write numbers or read numbers of the frame for the FIFO buffer. However, there has been a problem that whether or not the received frame is properly written or read, i.e. normality of the frame itself can not be monitored.

SUMMARY OF THE INVENTION

It is accordingly an object of the present invention to provide a frame buffer monitoring method and device which can monitor normality of a frame itself written in or read from the frame buffer.

[1] In order to achieve the above-mentioned object, a frame buffer monitoring method (or device) according to one embodiment of the present invention comprises: a first step of (or means) extracting information concerning a received frame to be added to a start (head) of the frame; a second step of (or means) writing the frame obtained at the first step (or means) in a frame buffer; a third step (or means) of reading the frame and the information concerning the frame from the frame buffer; and a fourth step of (or means) generating expectation information from the read information concerning the frame, and comparing the expectation information with the information concerning the frame included in the frame read at the third step (or means) to determine whether or not the expectation information is consistent with the information concerning the frame.

[2] Also, in the above-mentioned [1], the fourth step (or means) may include a step of (or means) setting a predetermined identifier within the frame invalid when determining that the expectation information is not consistent with the information concerning the frame.

[3] Also, in the above-mentioned [1], the fourth step (or means) may include a step of (or means) discarding the frame when determining that the expectation information is not consistent with the information concerning the frame.

[4] Also, in the above-mentioned [1], the fourth step (or means) may include a step of (or means) initializing a write destination address and a read source address of the frame buffer when determining that the expectation information is not consistent with the information concerning the frame.

[5] Also, in the above-mentioned [1], the information concerning the frame may comprise frame length information of the frame.

[6] Also, in the above-mentioned [1], the first step (or means) may include a step of (or means) dividing the frame into a plurality of part frames, and extracting information concerning each of the part frames to be added to a start of each of the part frames.

[7] Also, in the above-mentioned [6], the information concerning the frame may be composed of frame length information of the frame, frame length information of each of the part frames, and a serial number indicating a connection order of each of the part frames.

[8] Also, in the above-mentioned [6], the information concerning the frame may be composed of frame length information of the frame, part number information when the part frames are equally divided, and a serial number indicating a connection order of the part frames.

[9] Also, a frame buffer monitoring method (or device) according to one embodiment of the present invention comprises: a first step of (or means) extracting identifiers indicating a start and an end of a received frame as information concerning the frame to be added to the start of the frame; a second step of (or means) generating and transmitting a signal including the identifiers independently of the frame; a third step of (or means) writing the frame obtained at the first step (or means) in a frame buffer; a fourth step of (or means) reading the frame and the information concerning the frame from the frame buffer; and a fifth step of (or means) generating expectation information from the read information concerning the frame, and comparing the expectation information with the identifiers in the signal transmitted at the second step (or means) to determine whether or not the expectation information is consistent with the identifiers.

A frame buffer monitoring method (or device) according to an aspect of the present invention will now be described referring to a principle shown in FIG. 1, where the present invention is not limited thereto.

A frame information adding portion 100, corresponding to the first step (or means) of the above-mentioned [1]-[8], extracts information concerning a received frame FR to be added to a start of the frame FR (monitoring frame FR_MNT in FIG. 1). The information concerning the frame in this description is a frame length or the like of the received frame FR.

A write portion 210, corresponding to the second step (or means) of the above-mentioned [1]-[8], provides a frame write command CMD_W to a FIFO buffer 200 as a frame buffer to write the monitoring frame FR_MNT in the FIFO buffer 200 in the same way as the above-mentioned prior art examples [1] and [2].

On the other hand, a read portion 220, corresponding to the third step (or means) of the above-mentioned [1]-[8], provides a frame read command CMD_R to the FIFO buffer 200 to read the monitoring frame FR_MNT from the FIFO buffer 200, also in the same way as the above-mentioned prior art examples [1] and [2].

A controller 300, corresponding to the fourth step (or means) of the above-mentioned [1]-[8], generates expectation information from the information concerning the frame added to the start of the read monitoring frame FR_MNT. When the information concerning the frame is e.g. frame length information of the frame FR in this description, the expectation information is an expected frame length of the frame FR to be read from the FIFO buffer 200.

The controller 300 compares the expectation information with the information concerning the frame included in the frame FR within the monitoring frame FR_MNT read by the read portion 220 to determine consistency/inconsistency of both. As a result of the comparison, if "consistency" is determined, the controller 300 transmits the frame FR to the subsequent stage. Thus, it is possible to monitor the normality of the frame FR itself written and read in/from the FIFO buffer 200.

Also, as a result of the comparison, if "inconsistency" is determined, the controller 300 sets invalid a predetermined identifier within the frame FR at that time, namely performs e.g. a bit inversion or the like of an FCS (Frame Check Sequence). Then, the frame is transmitted to the subsequent stage as a discarded frame FR_DSP which should be discarded at the subsequent stage, or the frame FR is discarded as shown by the dotted line in FIG. 1. Thus, it is possible to prevent the frame FR not normally written or read in/from the FIFO buffer 200 from being processed as a normal frame at the subsequent stage.

Also, as a result of the comparison, if "inconsistency" is determined, the controller 300, as shown by long and short dashed lines in FIG. 1, provides to the write portion 210 and the read portion 220 an initialization indication IND_INIT so as to initialize a write destination address and a read source address.

Thus, it is possible to avoid and recover e.g. a state where an error arises in the control of the write destination address or the read source address for the FIFO buffer 200 or other states, and to normally perform the subsequent buffering control.

For example, when a bandwidth on a source (not shown) side of the frame FR is larger than that of the subsequent stage side, namely a frame write side for the FIFO buffer 200 is higher in bandwidth than a frame read side, the frame information adding portion 100 divides the frame FR into a plurality of part frames in order to absorb such a bandwidth difference, extracts the information concerning each of the part frames, and adds the information to the start of each of the part frames.

Since each of the part frames is written or read in a state where information concerning the frame is added respectively to the FIFO buffer 200, it is possible to monitor the writing in the FIFO buffer 200 and the reading from the FIFO buffer 200 for each frame in the same way as the case where no frame division is performed.

Also, the information concerning the frame in this case is composed of frame length information of the frame FR, frame length information of each of the part frames, and a serial No. indicating a connection order of the part frames. Thus, in addition to monitoring the normality of writing and reading the singular part frame, the controller 300 can determine whether or not the relationship between the frames divided by writing and reading in/from the FIFO buffer 200 is destructed, namely whether or not the total of the frame lengths of the part frames read is different from the frame length of the frame FR due to a data loss or the like upon writing or reading a certain frame, or whether or not the connection order of the part frames is changed due to a control error or the like of the write destination address or the read source address.

Also, regardless of the presence/absence of the bandwidth difference mentioned above, the frame information adding portion 100 equally divides the frame FR by a payload length of the ATM cell, when the subsequent stage side is e.g. the ATM network, and when the frame FR is required to be converted into an ATM cell, or the like.

In this case, the information concerning the frame is composed of frame length information of the frame FR, part number information of frames equally divided, and a serial No. indicating a connection order thereof. Thus, it becomes possible for the controller 300 to determine whether or not the total of the frames read is equal to the number of part frames equally divided, in addition to the determination of the shift of the frame connection order mentioned above.

Also, the frame information adding portion 100, corresponding to the first step (or means) and the second step (or means) of the above-mentioned [9], may extract identifiers indicating the start and the end of the frame FR received as the information concerning the frame, i.e. an SOP (Start Of Packet) and an EOP (End Of Packet) for example, and may output the monitoring frame FR_MNT where the information concerning the frame is added to the start of the frame FR. The frame information adding portion 100 generates a signal (not shown) including the SOP and the EOP independently of the monitoring frame FR_MNT to be transmitted.

In this case, the controller 300, corresponding to the fifth step (or means) of the above-mentioned [9], generates expectation information from the information concerning the frame read from the FIFO buffer 200, i.e. a signal indicating an expected position (timing) of the SOP and the EOP in the frame FR read. The controller 300 compares the expectation information with the SOP and the EOP within the signal transmitted by the frame information adding portion 100 to determine consistency/inconsistency of both, and may perform the same processing as the above.

According to the present invention, the normality of the frame itself written and read in/from the frame buffer can be monitored, thereby enabling a reliability of the buffering control to be improved.

Furthermore, when the abnormality of the frame written and read is detected, the frame is invalidated or discarded, or the write destination address and the read destination address for the frame buffer are initialized, thereby enabling a propagation of the abnormal frame to the subsequent stage to be prevented.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Figure 1:
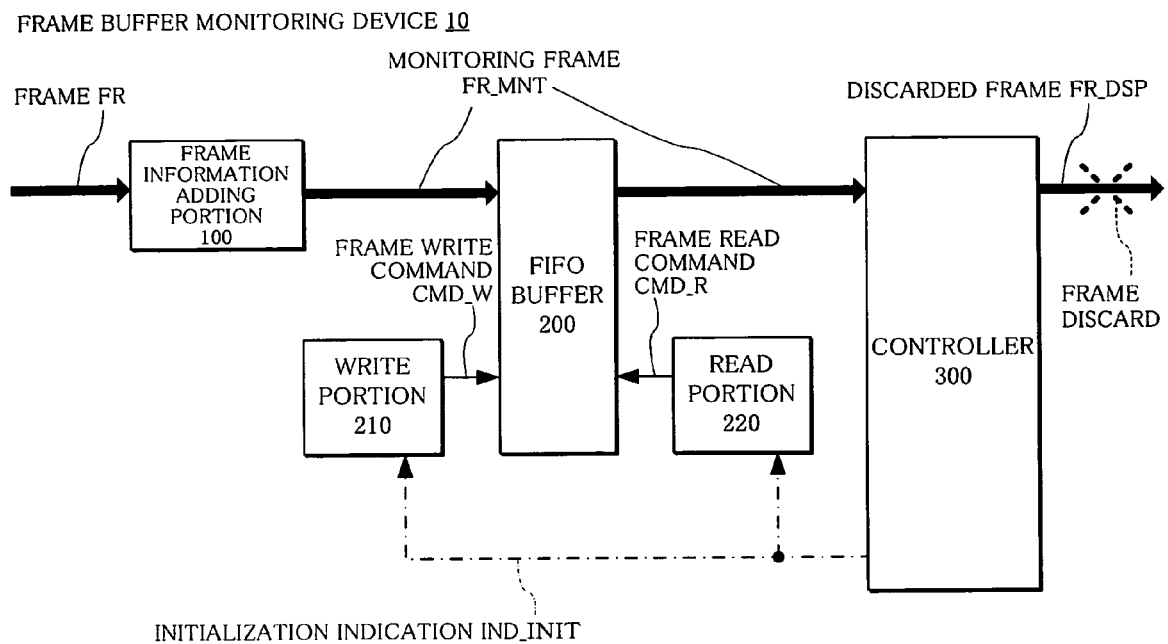
FIG. 1 is a block diagram showing a principle of a frame buffer monitoring method and device according to the present invention.

Hereinafter, embodiments [1] and [2] of a frame buffer monitoring method and a device using the same according to the present invention whose principle is shown in FIG. 1 will be described referring to FIGS. 2, 3A, 3B, 4-7, 8A, 8B, 8C, and 9 respectively.

Embodiment [1]

FIGS. 2, 3A, 3B, 4-6

Figure 2:
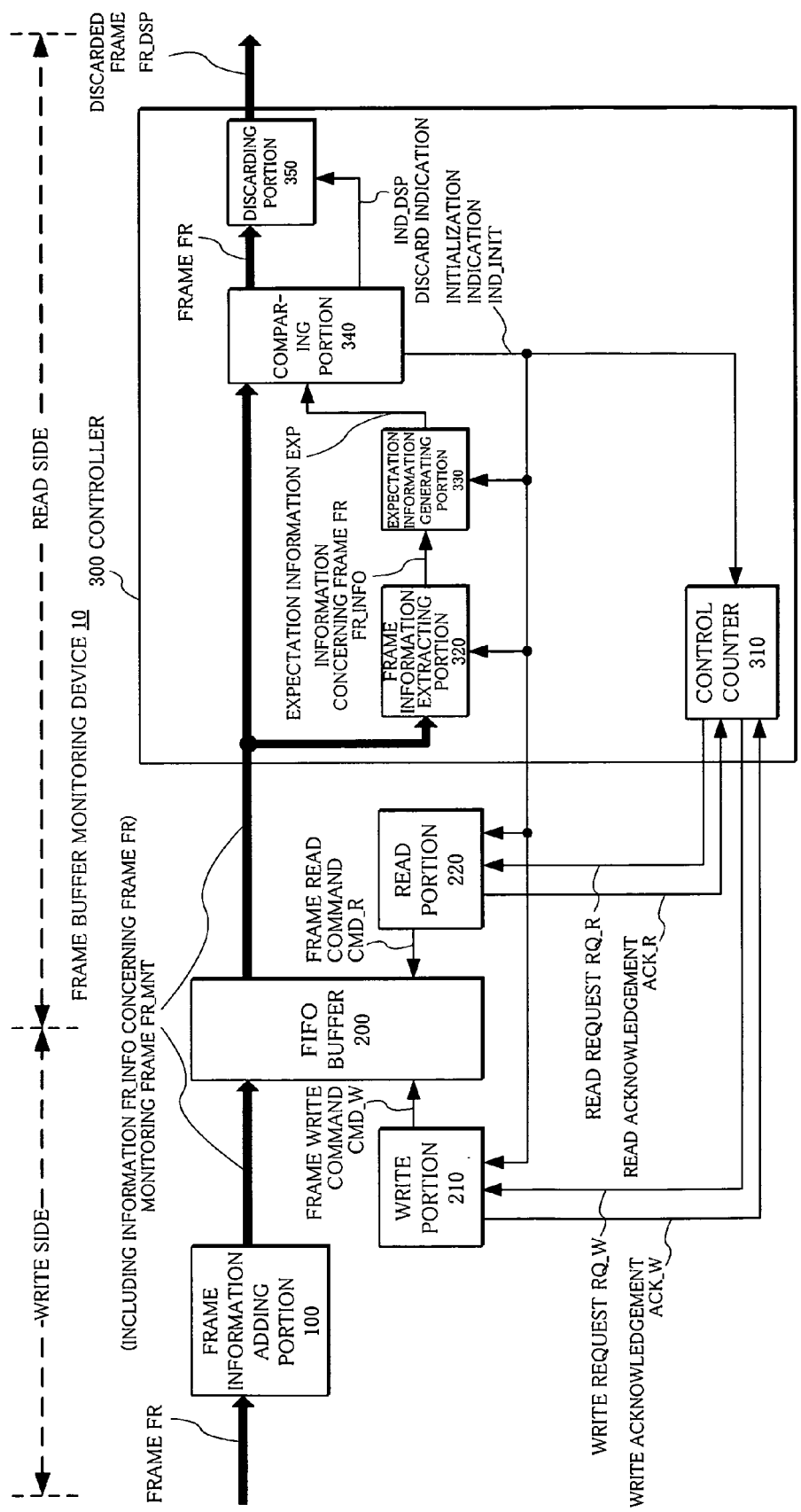
FIG. 2 is a block diagram showing an embodiment [1] of a frame buffer monitoring method and device according to the present invention.

[1]-1 Arrangement: FIG. 2

The frame buffer monitoring device 10 shown in FIG. 2, in the same way as FIG. 1, is composed of the frame information adding portion 100 extracting information FR_INFO concerning the frame FR received and making the frame the monitoring frame FR_MNT where the extracted information is added to the start of the frame FR, the FIFO buffer 200 storing the monitoring frame FR_MNT, the write portion 210 and the read portion 220 respectively writing and reading the monitoring frame FR_MNT in/from the FIFO buffer 200, and the controller 300 controlling the write portion 210 and the read portion 220.

Figure 11:
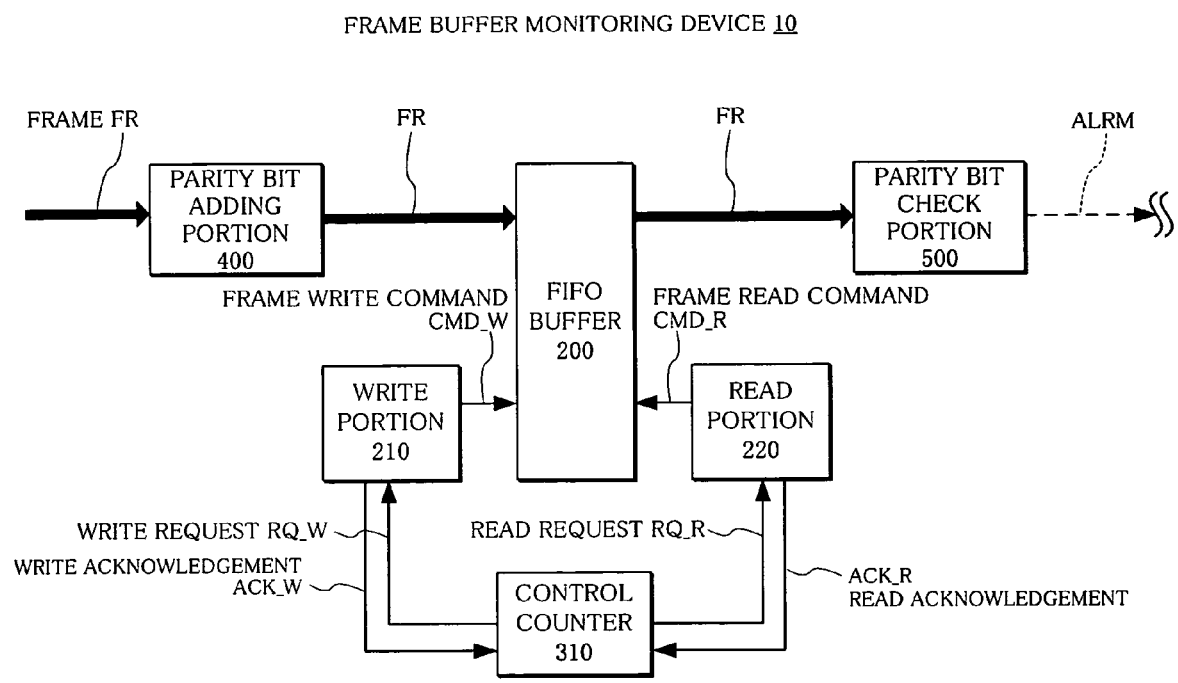
FIG. 11 is a block diagram showing a prior art example [1] of a frame buffer monitoring device.
Figure 12:
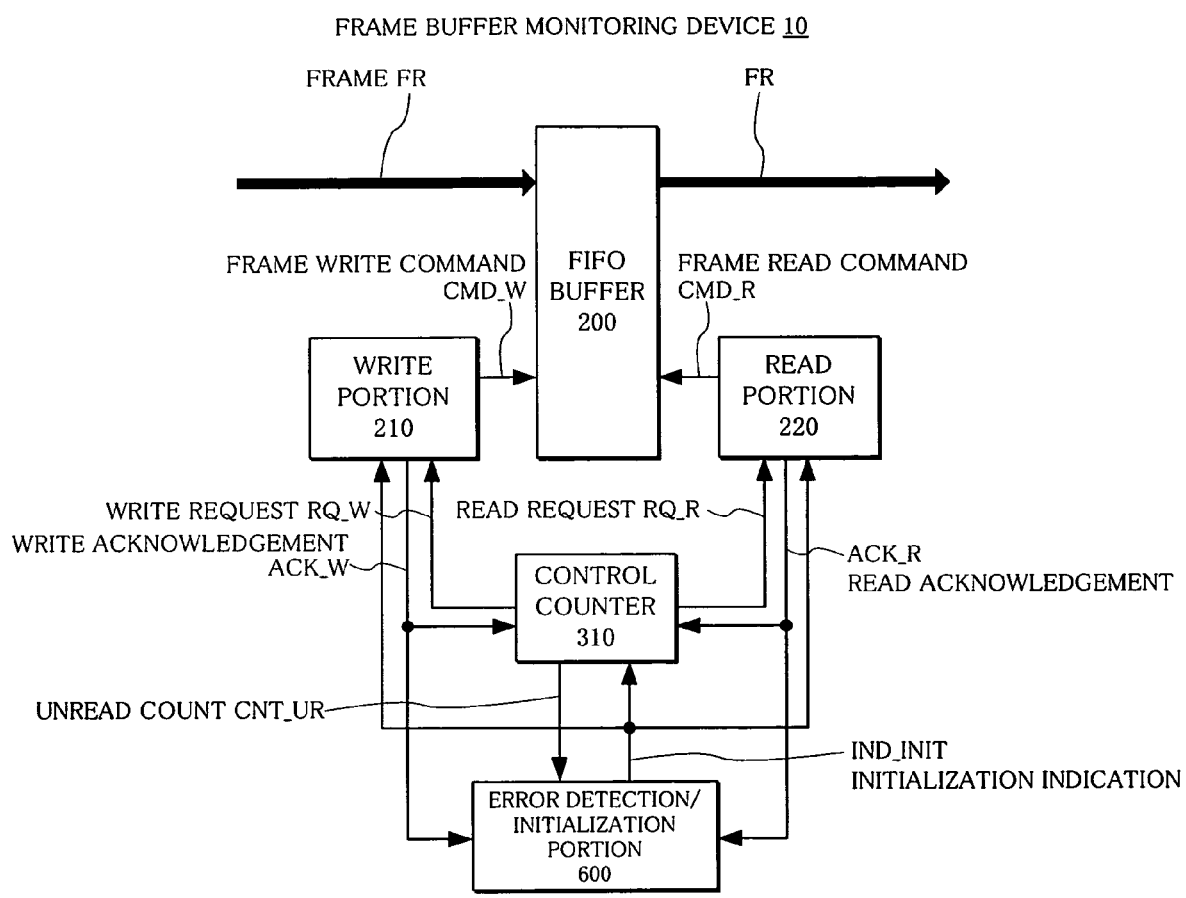
FIG. 12 is a block diagram showing a prior art example [2] of a frame buffer monitoring device.

The controller 300 is further provided in this embodiment with a control counter 310 which is the same as that of the prior art examples shown in FIGS. 11 and 12, a frame information extracting portion 320 extracting the information FR_INFO concerning the frame added to the start of the monitoring frame FR_MNT read from the FIFO buffer 200, an expectation information generating portion 330 generating expectation information EXP from the extracted information FR_INFO concerning the frame, a comparing portion 340 comparing the expectation information EXP with the information FR_INFO concerning the frame included in the frame FR within the monitoring frame FR_MNT read to determine consistency/inconsistency therebetween, and a discarding portion 350 making the frame a discarded frame FR_DSP in which e.g. FCS within the frame FR is set invalid when "inconsistency" is determined as a result of the comparison at the comparing portion 340, and transmitting the frame FR to the subsequent stage when "consistency" is determined.

[1]-2 Operation: FIGS. 2, 3A, 3B 4-6

The operation of the embodiment [1] will now be described. Firstly, the overall operation will be described referring to FIGS. 2, 3A, and 3B. As mentioned above, the information FR_INFO concerning the frame depends on a case (1) where the frame FR is written in the FIFO buffer 200 without being divided, a case (2) where the frame is written after having been divided, and a case (3) where the frame FR is written after having been equally divided. In each case, the generated expectation information EXP is different. Accordingly, since the determination methods of the comparing portion 340 are different from each other, frame buffer monitoring examples (1)-(3) corresponding to the cases (1)-(3) will be described referring to FIGS. 4-6. It is to be noted that since various frame buffer monitoring methods can be conceived, the method is not limited to the following operation examples.

Figure 3A:
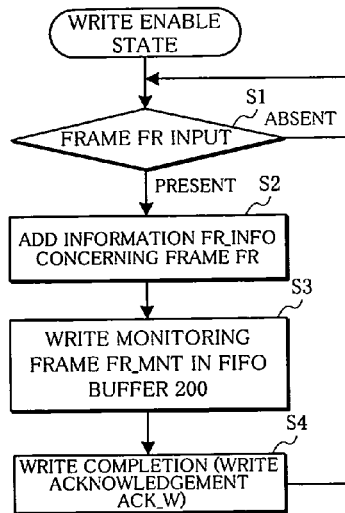
FIGS. 3A and 3B are flowcharts showing an overall operation embodiment of a frame buffer monitoring method and device according to the present invention.
Figure 3B:
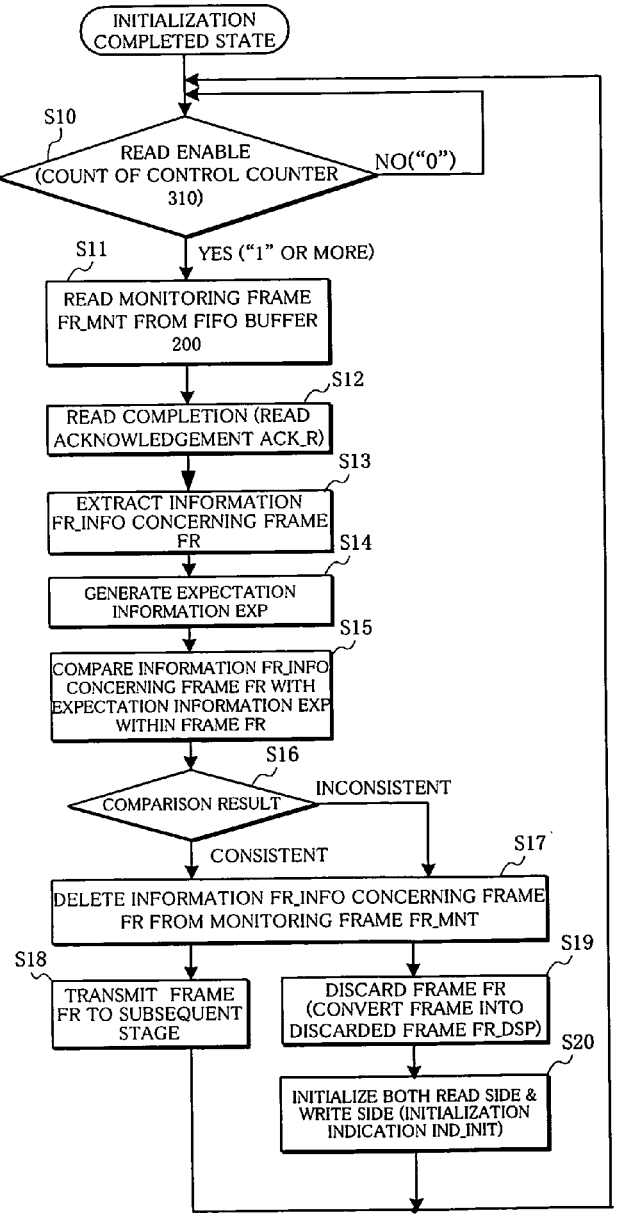

[1]-2-1 Overall Operation: FIGS. 2, 3A, and 3B

FIGS. 3A and 3B are flowcharts showing the overall operation of the frame buffer monitoring device 10 in FIG. 2.

FIG. 3A shows the operations for writing the received frame RF in the FIFO buffer 200, i.e. the operations of the frame information adding portion 100 and the write portion 210. FIG. 3B shows the operations for reading the monitoring frame FR_MNT from the FIFO buffer 200, i.e. the operations of the read portion 220 and the controller 300.

It is now supposed that e.g. the FIFO buffer 200 of the frame buffer monitoring device 10 is in a write enable state and an initialization completed state of a read source address.

When the frame FR is inputted (at step S1) in this state, the frame information adding portion 100 extracts the information FR_INFO concerning the frame within the frame FR to be added to the start of the frame FR, and then the frame is outputted as the monitoring frame FR_MNT (at step S2). The write portion 210 provides the frame write command CMD_W to the FIFO buffer 200, writes the monitoring frame FR_MNT in the FIFO buffer 200 (at step S3), and returns a write acknowledgment ACK_W to the control counter 310 (at step S4).

The control counter 310 having received the write acknowledgment ACK_W increments the count. Thus, the control counter 310 recognizes that the monitoring frame FR_MNT readable is stored in the FIFO buffer 200 (counter value is "1" or more), so that a read request RQ_R is provided to the read portion 220 (at step S10).

The read portion 220 having received the read request RQ_R provides the read command CMD_R to the FIFO buffer 200, reads the monitoring frame FR_MNT stored in the FIFO buffer 200 (at step S11), and returns a read acknowledgment ACK_R to the control counter 310 (at step S12). The control counter 310 having received the read acknowledgment ACK_R decrements the count.

The frame information extracting portion 320 extracts the information FR_INFO concerning the frame added to the start of the monitoring frame FR_MNT read (at step S13), and provides the information FR_INFO concerning the frame to the expectation information generating portion 330.

The expectation information generating portion 330 having received the information FR_INFO concerning the frame generates the expectation information EXP from the information FR_INFO concerning the frame to be provided to the comparing portion 340 (at step S14).

The comparing portion 340 having received the expectation information EXP compares the expectation information EXP with the information FR_INFO concerning the frame included in the frame FR within the monitoring frame FR_MNT read from the FIFO buffer 200 (at step S15). As a result of the comparison at step S15, when "consistency" is determined (at step S16), the comparing portion 340 deletes the information FR_INFO concerning the frame from the start of the monitoring frame FR_MNT to return the frame to an original frame FR (at step S17). Then, this frame FR is transmitted to the subsequent stage (at step S18).

Also, when "inconsistency" is determined at the above-mentioned step S16, the comparing portion 340 restores the monitoring frame FR_MNT to the original frame FR in the same way as the above-mentioned step S17, and provides a discard indication IND_DSP of discarding the frame FR to the discarding portion 350.

The discarding portion 350 having received the discard indication IND_DSP converts the frame into a discarded frame FR_DSP where bits of the FCS within the frame FR are inverted to be transmitted to the subsequent stage (at step S19). It is to be noted that the discarding portion 350 may simply discard (without transmitting the frame FR to the subsequent stage) the frame FR.

Also, when "inconsistency" is determined at the above-mentioned step S16, the comparing portion 340 provides the initialization indication IND_INIT to the write portion 210, the read portion 220, the control counter 310, the frame information extracting portion 320, and the expectation information generating portion 330 commonly, and initializes the write destination address and the read source address, as well as the information FR_INFO concerning the frame in processing, the expectation information EXP, and the like (at step S20).

Figure 4:
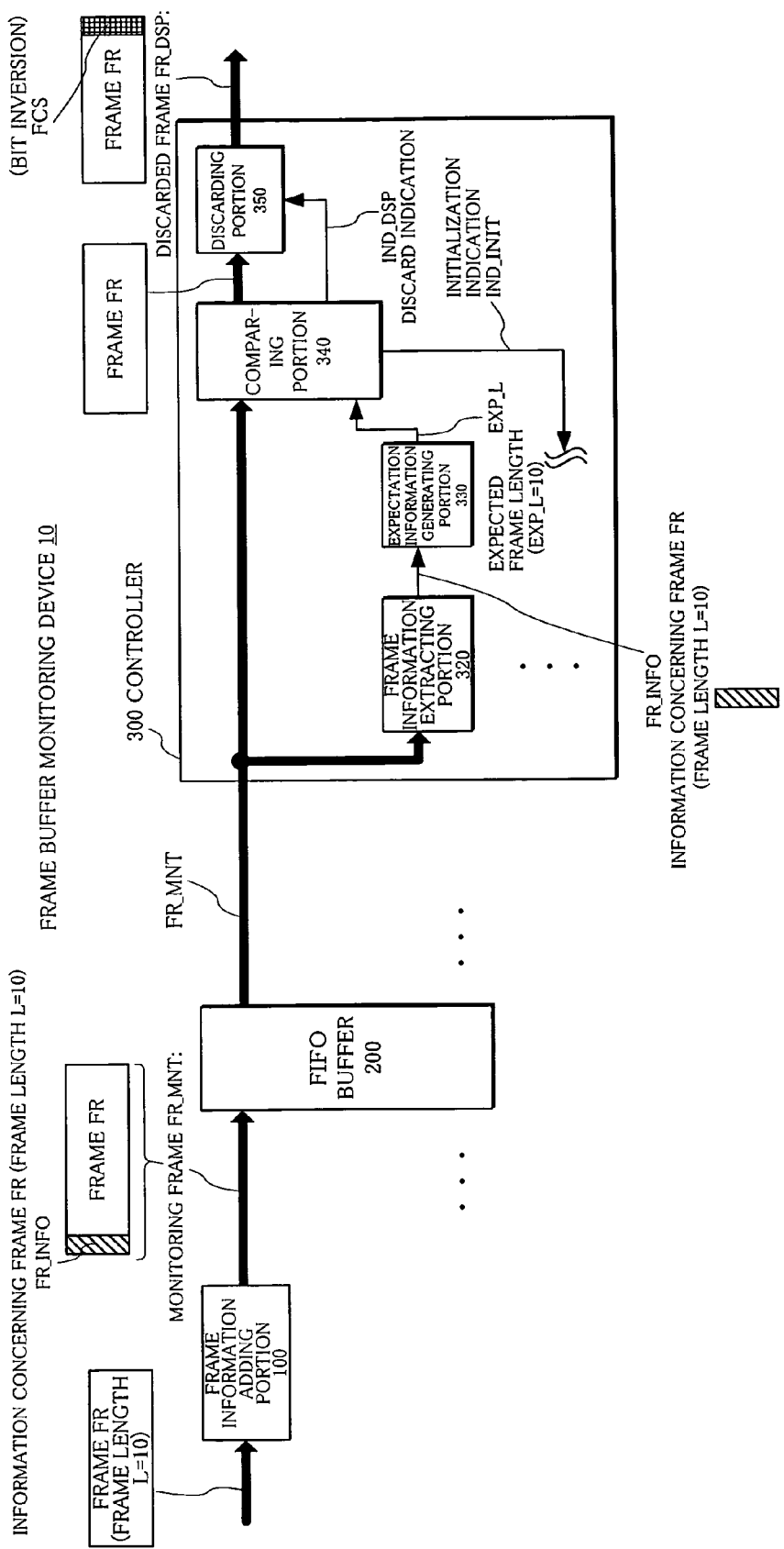
FIG. 4 is a block diagram showing a frame buffer monitoring example (1) of an embodiment [1] of a frame buffer monitoring method and device according to the present invention.

[1]-2-2 Frame Buffer Monitoring Example (1) (No Frame Division): FIG. 4

FIG. 4 shows a partial arrangement extracted and emphasized within the frame buffer monitoring device 10 shown in FIG. 2 according to the monitoring operation when the frame FR is not divided, where the write portion 210, the read portion 220, and the control counter 310 are omitted. The same applies to the frame buffer monitoring examples (2) and (3) which will be described later.

It is now supposed that as shown in FIG. 4, an actual frame length L of the received frame FR is e.g. "10". The frame information adding portion 100 extracts the frame length L from the frame FR as the information FR_INFO concerning the frame to be added to the start of the frame FR, and the frame is outputted as the monitoring frame FR_MNT. This monitoring frame FR_MNT is written in the FIFO buffer 200.

On the other hand, when the monitoring frame FR_MNT is read from the FIFO buffer 200, the frame information extracting portion 320 extracts the information FR_INFO (frame length L="10") concerning the frame from the monitoring frame FR_MNT to be provided to the expectation information generating portion 330.

The expectation information generating portion 330 having received the information FR_INFO concerning the frame generates an expected frame length EXPE_L (="10") as expectation (expected value) information EXP from the information FR_INFO concerning the frame, and provides the generated expected frame length EXP_L to the comparing portion 340.

The comparing portion 340 having received the expected frame length EXP_L compares the expected frame length EXP_L with an actual frame length L of the frame FR within the monitoring frame FR_MNT read from the FIFO buffer 200. When both are "consistent", the comparing portion 340 transmits the frame FR to the subsequent stage. On the other hand, when both are "inconsistent", namely when the frame length L is shortened due to a data loss upon reading, the comparing portion 340 provides the discard indication IND_DSP to the discarding portion 350.

The discarding portion 350 having received the discard indication IND_DSP transmits the discarded frame FR_DSP with bits of the FCS within the frame FR being inverted to the subsequent stage.

Figure 5:
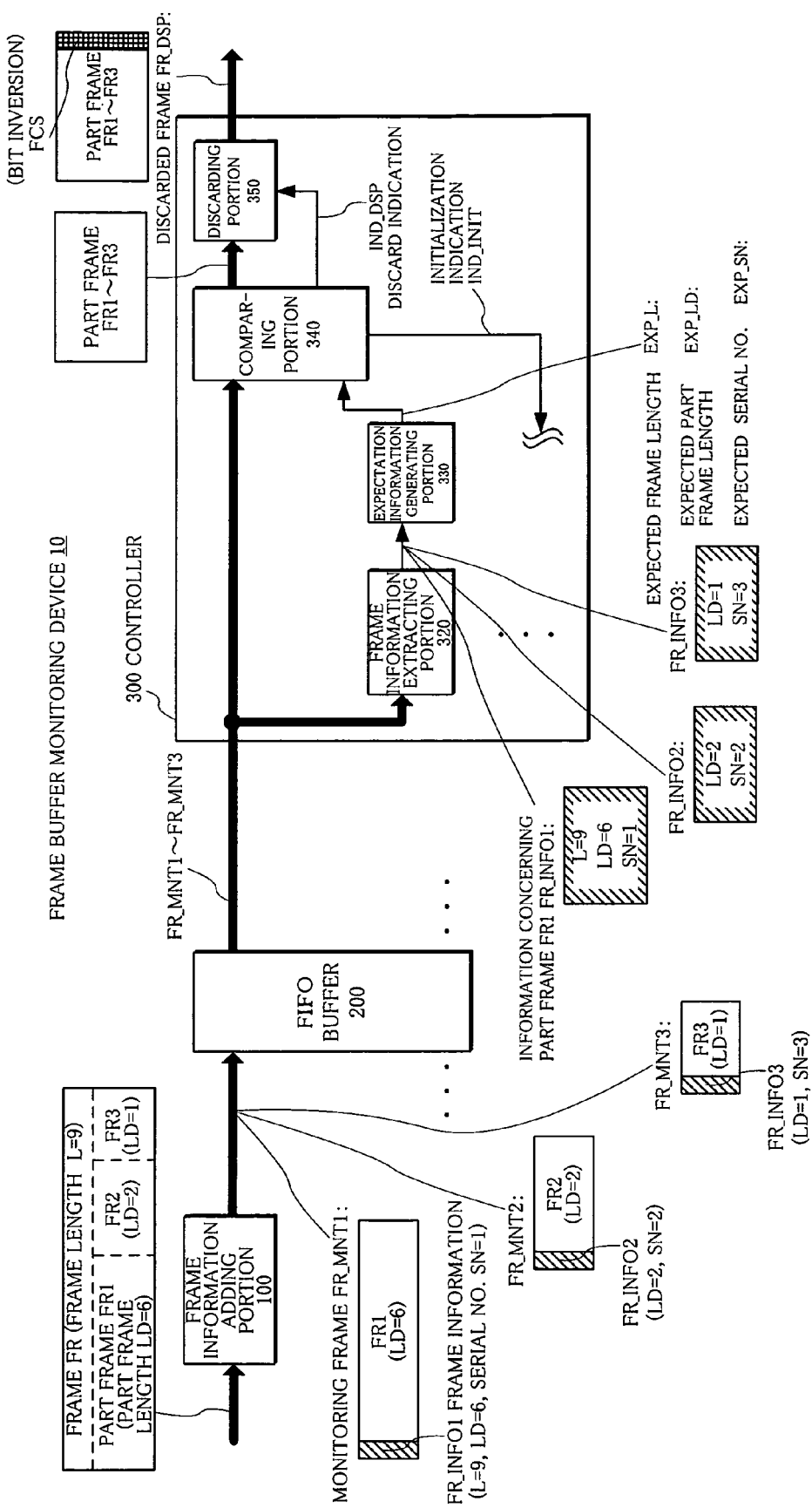
FIG. 5 is a block diagram showing a frame buffer monitoring example (2) of an embodiment [1] of a frame buffer monitoring method and device according to the present invention.

[1]-2-3 Frame Buffer Monitoring Example (2) (With Frame Division (Variable Length)): FIG. 5

It is now supposed that the actual frame length L of the frame FR received is e.g. "9" as shown in FIG. 5, and that this frame FR is divided into three part frames FR1-FR3 by the frame information adding portion 100. Also, it is now supposed that the lengths of the part frames FR1-FR3 LDs are respectively "6", "2", and "1".

Firstly, the frame information adding portion 100 extracts the actual frame length L (="9") of the frame FR received, and divides the frame FR into the part frames FR1-FR3 mentioned above. The frame information adding portion 100 further outputs a monitoring frame FR_MNT1 where the frame length L of the frame FR, a part frame length LD (="6"), and a serial No. SN (="1") of the part frame FR1 as information FR_INFO1 concerning the frame are added to the start of the part frame FR1.

Similarly, the frame information adding portion 100 outputs monitoring frames FR_MNT2 and FR_MNT3 in which (part frame length LD, serial No. SN)={2, 2} and {1, 3} are respectively made information FR_INFO2 and FR_INFO3 concerning the frame for the part frames FR2 and FR3.

These monitoring frames FR_MNT1-FR_MNT3 are respectively written in the FIFO buffer 200.

It is to be noted that the reason why the frame length L of the frame FR is added only to the information FR_INFO1 concerning the frame is to compare the total of the part frame lengths LDs of the part frames FR1-FR3 with the frame length L of the frame FR in the comparing portion 340 which will be described later.

On the other hand, when the monitoring frame FR_MNT1 is read from the FIFO buffer 200, the frame information extracting portion 320 extracts the information FR_INFO1 ((frame length L, part frame length LD, serial No. SN)={9, 6, 1}) concerning the frame from the monitoring frame FR_MNT1 to be provided to the expectation information generating portion 330.

The expectation information generating portion 330 having received the information FR_INFO1 concerning the frame generates the expectation information EXP (expected frame length EXP_L, expected part frame length EXP_LD, expected serial No. EXP_SN=9, 6, 1) from the information FR_INFO1 concerning the frame to be provided to the comparing portion 340.

The comparing portion 340 having received the expected frame length EXP_L, the expected part frame length EXP_LD, and the expected serial No. EXP_SN performs comparisons of the followings (A)-(C);

(A) Compare the expected part frame length EXP_LD with the actual part frame length LD of the part frame FR in the monitoring frame FR_MNT read from the FIFO buffer 200, (B) Compare the expected serial No. EXP_SN with an actual arrival order of the part frame FR, and (C) Compare the total of the expected part frame length EXP_LD with the total of the actual part frame length LD (or actual frame length L).

Also, when the monitoring frames FR_MNT2 and FR_MNT3 are read from the FIFO buffer 200, the generation of the expectation information EXP and the comparison therebetween are performed in the same way as the above.

When "inconsistency" is determined in any of the above-mentioned comparison results (A)-(C), the comparing portion 340 provides the discard indication IND_DSP to the discarding portion 350 in the same way as the above-mentioned frame buffer monitoring example (1).

On the other hand, only when "consistency" is determined in all of the comparison results of the above-mentioned (A)-(C), the comparing portion 340 transmits the part frames FR1-FR3 to the subsequent stage.

Figure 6:
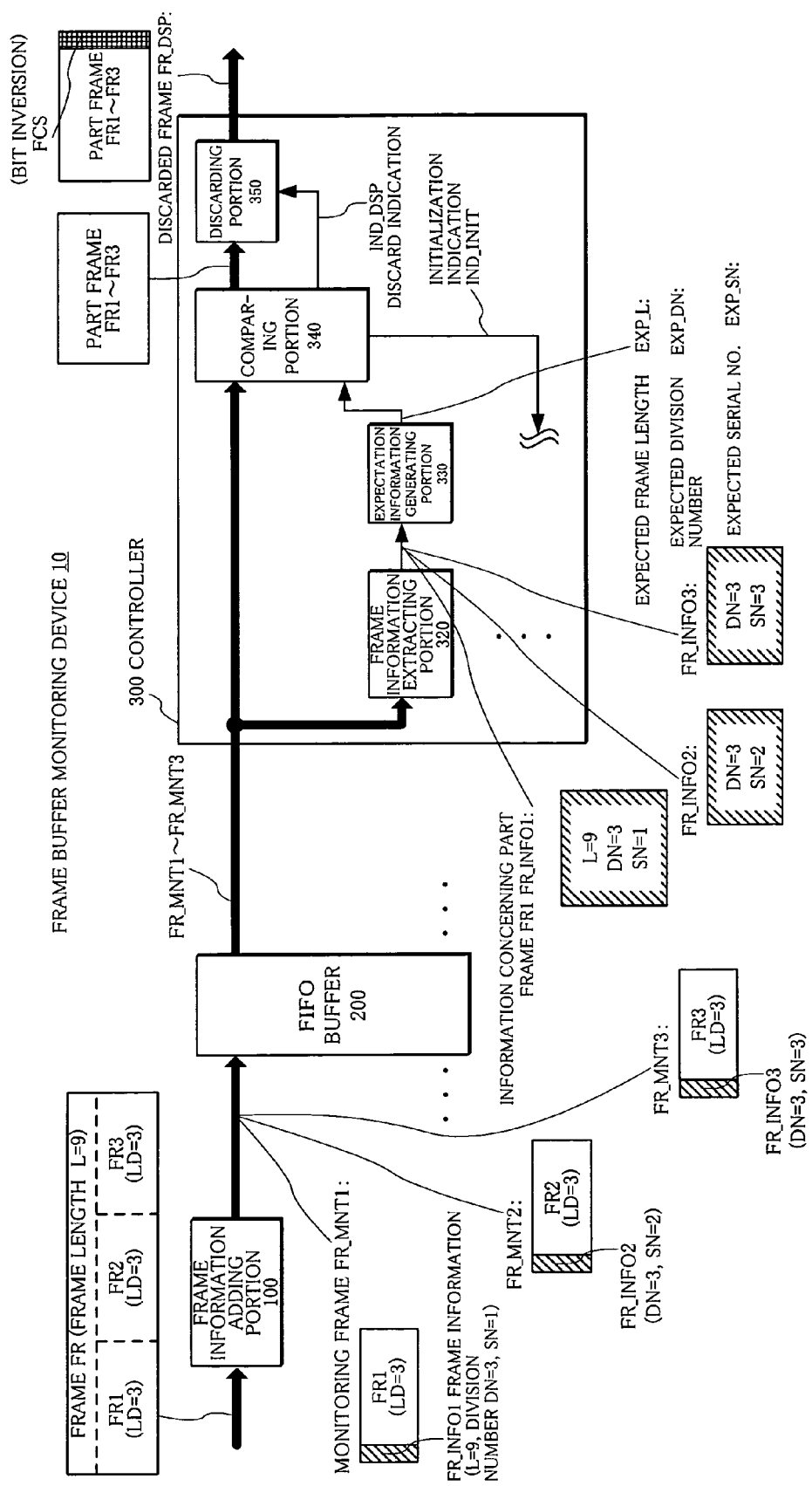
FIG. 6 is a block diagram showing a frame buffer monitoring example (3) of an embodiment [1] of a frame buffer monitoring method and device according to the present invention.

[1]-2-4 Frame Buffer Monitoring Example (3) (With Frame Division (Fixed Length)): FIG. 6

It is now supposed that the frame FR shown in FIG. 6 is divided in the same way as the above-mentioned frame buffer monitoring example (2) but that the frame is equally divided into three part frames FR1-FR3 by a fixed length unit (part frame length LD="3") by the frame information adding portion 100, different from the above-mentioned frame buffer monitoring example (2).

Firstly, the frame information adding portion 100 extracts the actual frame length L (="9") of the frame FR received, and divides the frame FR into the above-mentioned part frames FR1-FR3. The frame information adding portion 100 further outputs the monitoring frame FR_MNT1 in which the frame length L of the frame FR, the division number DN (="3"), and the serial No. SN (="1") of the part frame FR1 as the information FR_INFO1 concerning the frame are added to the start of the part frame FR1.

Similarly, the frame information adding portion 100 outputs monitoring frames FR_MNT2 and FR_MNT3 in which (division number DN, serial No. SN)={3, 2} and {3, 3} are respectively made information FR_INFO2 and FR_INFO3 concerning the frame for the part frames FR2 and FR3.

These monitoring frames FR_MNT1-FR_MNT3 are respectively written in the FIFO buffer 200.

On the other hand, when the monitoring frame FR_MNT1 is read from the FIFO buffer 200, the frame information extracting portion 320 extracts the information FR_INFO1 ((frame length L, division number DN, serial No. SN)={9, 3, 1}) concerning the frame from the monitoring frame FR_MNT1 to be provided to the expectation information generating portion 330.

The expectation information generating potion 330 having received the information FR_INFO1 concerning the frame generates the expectation information EXP (expected frame length EXP_L, expected division number EXP_DN, expected serial No. EXP_SN=9, 3, 1) from the information FR_INFO1 concerning the frame to be provided to the comparing portion 340.

The comparing portion 340 having received the expected frame length EXP_L, the expected division number EXP_DN, and the expected serial No. EXP_SN performs comparisons of the followings (A) and (B);
(A) Compare the expected division number EXP_DN with an actual (final) arrival number of the part frames FR, and
(B) Compare the expected serial No. EXP_SN with the actual arrival order of the part frames FR.

Also, when the monitoring frames FR_MNT2 and FR_MNT3 are read from the FIFO buffer 200, the generation of the expectation information EXP and the comparison therebetween are performed in the same way as the above. Only when the monitoring frame FR_MNT3, i.e. the final part frame FR3 is read (when the expected division number EXP_DN is consistent with the expected serial No. EXP_SN), the comparing portion 340 having received the expectation information EXP performs the comparison of the following (C);
(C) Compare the expected frame length EXP_L with the total of the actual part frame lengths LDs.

When "inconsistency" is determined in any of the comparison results of the above-mentioned (A)-(C), the comparing portion 340 provides the discard indication IND_DSP to the discarding portion 350 in the same way as the above-mentioned frame buffer monitoring examples (1) and (2).

On the other hand, only when "consistency" is determined in the comparison results of the above-mentioned (A)-(C), the comparing portion 340 transmits the part frames FR1-FR3 to the subsequent stage.

Embodiment [2]

FIGS. 7, 8A, 8B, 8C, and 9

Figure 7:
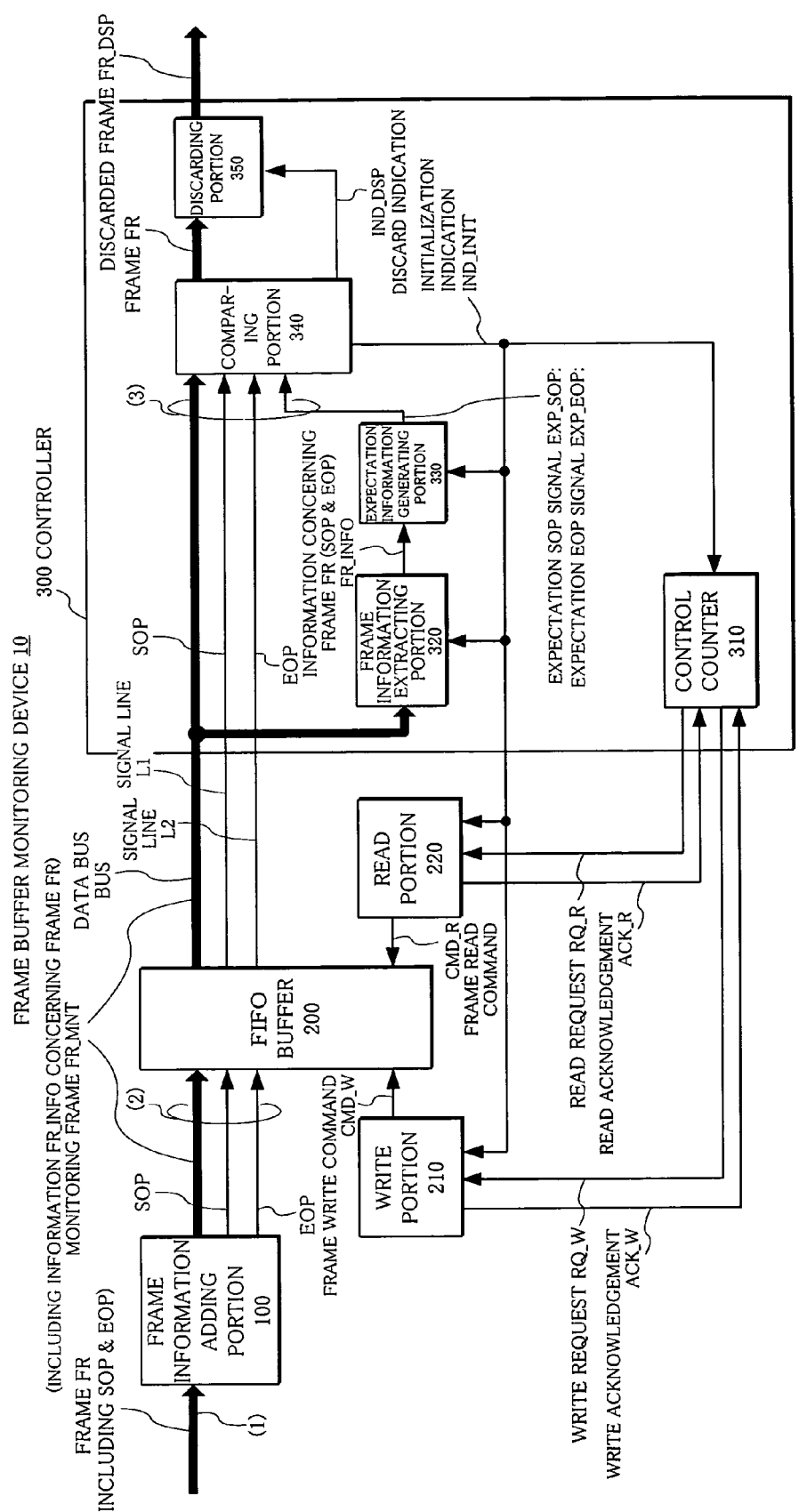
FIG. 7 is a block diagram showing an embodiment [2] of a frame buffer monitoring method and device according to the present invention.

[2]-1 Arrangement: FIG. 7

The frame buffer monitoring device 10 shown in FIG. 7 is provided with signal lines L1 and L2 for respectively transmitting signals including an SOP and EOP of the frame FR in addition to a data bus BUS for writing and reading the frame FR for the FIFO buffer 200 shown in the above-mentioned embodiment [1].

The SOP signal and the EOP signal are generated by the method which will be described later by the frame information adding portion 100, and do not require another specific signal generation circuit.

[2]-1 Operation: FIGS. 8A, 8B, 8C, and 9

Figure 8A:
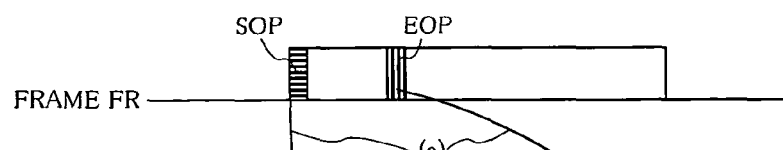
FIGS. 8A-8C are time charts showing an operation of an embodiment [2] of a frame buffer monitoring method and device according to the present invention.
Figure 8B:
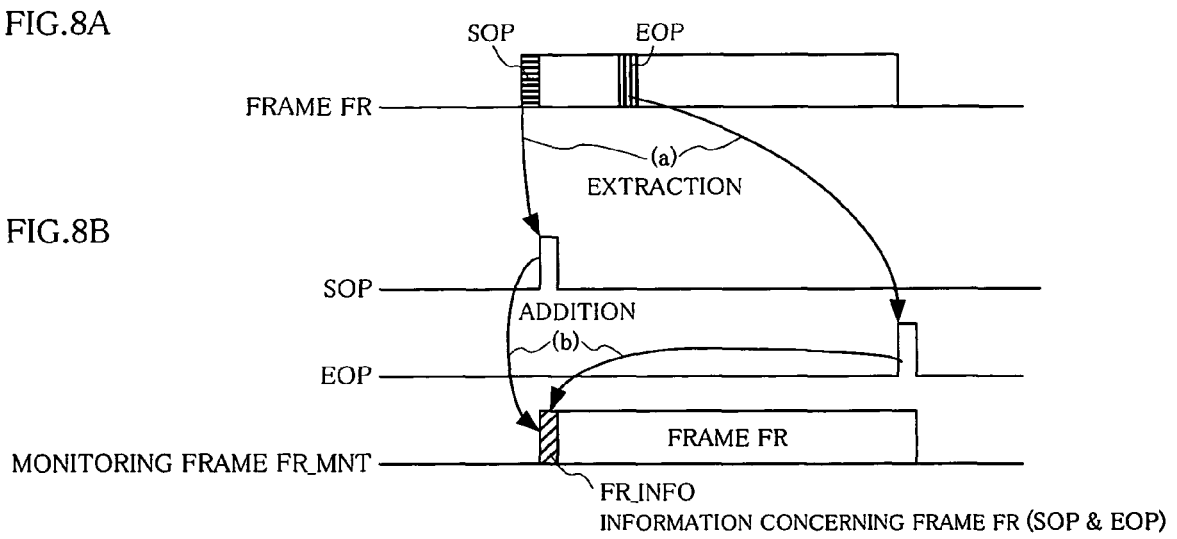
Figure 8C:
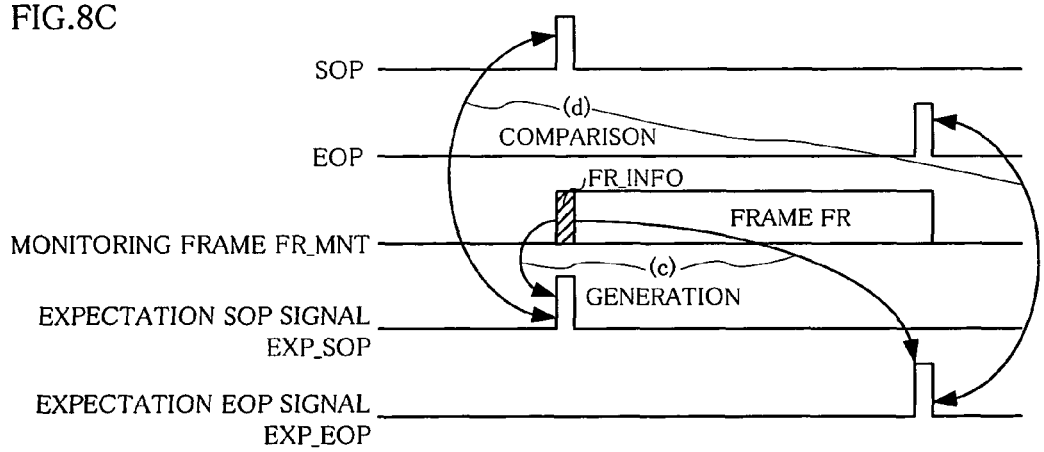

FIGS. 8A-8C are time charts showing an operation of the frame buffer monitoring device 10 shown in FIG. 7. FIGS. 8A-8C respectively correspond to points (timings) of (1)-(3) in FIG. 7.

When the frame FR received is e.g. an Ethernet frame, as shown in FIGS. 8A and 8B, the frame information adding portion 100 specifies and extracts the SOP from e.g. a preamble and a bit pattern of an SFD (Start Frame Delimiter) in header information within the Ethernet frame. For example, the frame information adding portion 100 extracts ((a) in FIG. 8A) the EOP by calculation from frame length information within e.g. the header information. The frame information adding portion 100 generates the signal including the SOP and EOP respectively to be transmitted to the subsequent stage.

Also, the frame information adding portion 100 adds ((b) in FIG. 8B) the extracted SOP and EOP to the start of the frame FR as the information FR_INFO concerning the frame to be outputted as the monitoring frame FR_MNT. The monitoring frame FR_MNT is written in the FIFO buffer 200.

On the other hand, when the monitoring frame FR_MNT is read, the frame information extracting portion 320 extracts the information FR_INFO (SOP and EOP) concerning the frame from the monitoring frame FR_MNT to be provided to the expectation information generating portion 330.

The expectation information generating portion 330 having received the information FR_INFO concerning the frame generates the expected SOP signal EXP_SOP and the expected EOP signal EXP_EOP as the expectation information EXP from the information FR_INFO concerning the frame to be provided to the comparing portion 340, as shown in FIG. 8C. The comparing portion 340 having received the expected SOP signal EXP_SOP and the expected EOP signal EXP_EOP performs the comparison ((d) in FIG. 8C) of the SOP signal and the EOP signal mentioned above.

Figure 9:
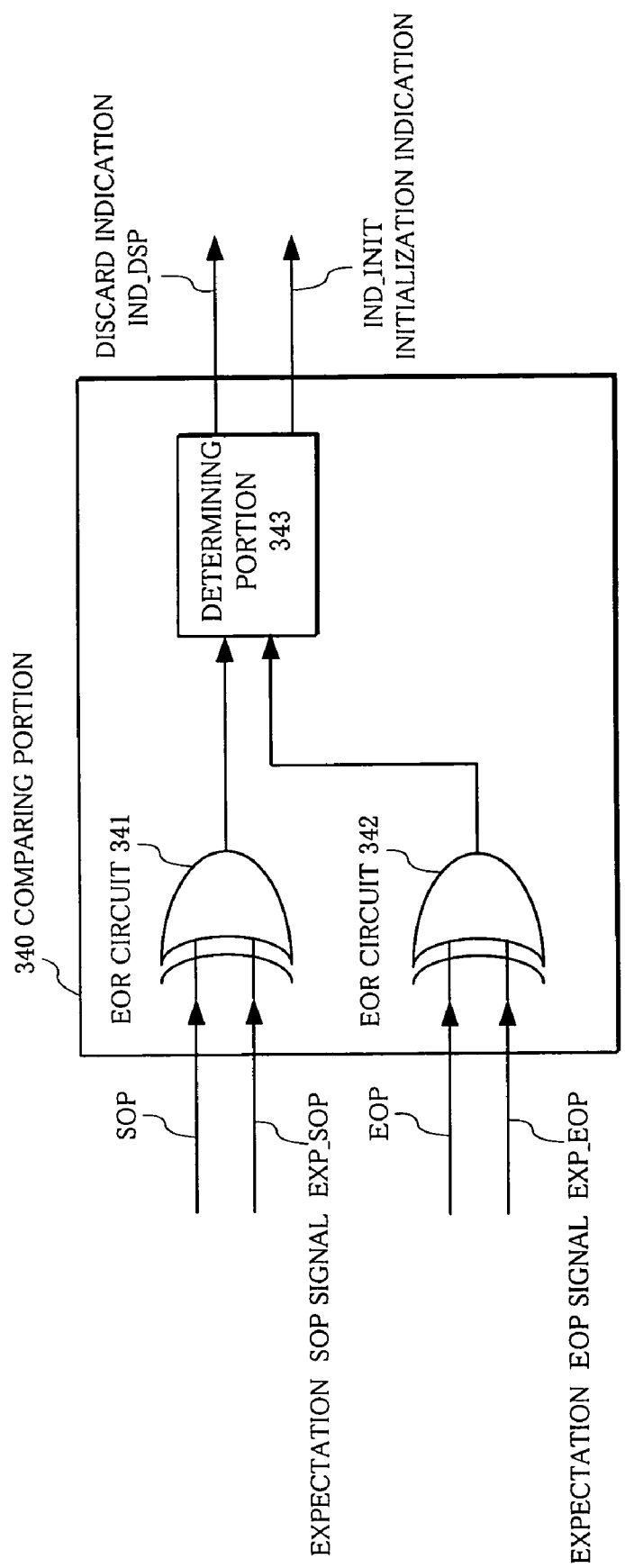
FIG. 9 is a circuit diagram showing an arrangement of a comparing portion used for an embodiment [2] of a frame buffer monitoring method and device according to the present invention.
Figure 10:
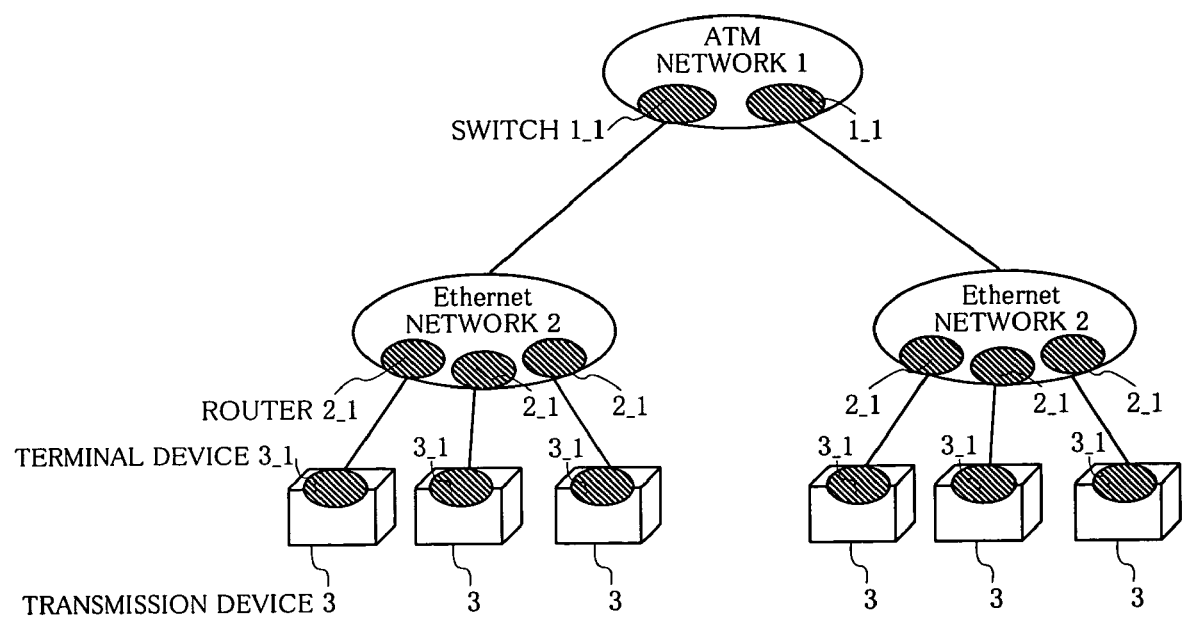
FIG. 10 is a block diagram showing places in a communication system to which the present invention and the prior art example are applied.

FIG. 9 is a circuit diagram showing an arrangement of the comparing portion 340 in this embodiment.

The comparing portion 340 is provided with an EOR circuit 341 which receives the SOP signal and the expected SOP signal EXP_SOP, an EOR circuit 342 which receives the EOP signal and the expected EOP signal EXP_EOP, and a determining portion 343 which performs processing which will be described later based on the output signal from both of the EOR circuits 341 and 342.

Only when the timings of the SOP signal and the expected SOP signal EXP_SOP (or EOP signal and the expected EOP signal EXP_EOP) are mutually different or inconsistent with each other, the EOR circuit 341 (or EOR circuit 342) outputs a signal of "1" to the determining portion 343.

The determining portion 343 performs the following processings (A)-(D) based on the output signals from the EOR circuits 341 and 342.
(A) When both of the output signals from the EOR circuits 341 and 342 are "1", it means that the timings of the SOP signal and the EOP signal are deviated, indicating that e.g. mismatch (address deviation) between the write destination address control and the read source address control of the frame FR for the FIFO buffer 200 has occurred. Therefore, the discard indication IND_DSP is provided to the discarding portion 345, so that the initialization indication IND_INIT is provided to the read side and the write side of the FIFO buffer 200.

(B) When only the output signal from the EOR circuit 341 is "1", it means that only the timing of the SOP signal is deviated, indicating that the frame FR is read halfway, namely the address deviation has occurred in the same way as the above-mentioned (A). Therefore, the same processing as the above-mentioned (A) is performed.

(C) When only the output signal from the EOR circuit 342 is "1", it means that only the timing of the EOP signal is deviated, indicating that a data loss has occurred e.g. upon reading of the frame FR and the frame length is shortened. Therefore, the discard indication IND_DSP is provided to the discarding portion 345 so as to discard the frame FR.

(D) When both of the output signals from the EOR circuits 341 and 342 are "0", it means that the timings of the SOP signal and the EOP signal are consistent, indicating that the write and the read of the frame FR for the FIFO buffer 200 is properly performed. Therefore, the frame FR is transmitted to the subsequent stage (normal processing).

It is to be noted that the present invention is not limited by the above-mentioned embodiments, and it is obvious that various modifications may be made by one skilled in the art based on the recitation of the claims.

What is claimed is:

1. A frame buffer monitoring method comprising:
   extracting start of packet (SOP) information and end of packet (EOP) information concerning a received frame and adding the SOP and EOP information concerning the frame to a start of the frame, the frame being a variable-length packet;
   writing the frame added with the SOP and EOP information added concerning the frame obtained at the extracting in a frame buffer;
   reading the frame from the frame buffer and generating SOP and EOP signals concerning the frame from the frame read; and
   generating expectation SOP and EOP signals from the SOP and EOP information concerning the frame extracted, and comparing positions or timings of the expectation SOP and EOP signals with the SOP and EOP signals generated at the reading to determine whether or not the expectation SOP and EOP signals are consistent with the SOP and EOP signals generated at the reading.

2. The frame buffer monitoring method as claimed in claim 1, wherein the generating includes setting a predetermined identifier within the frame invalid when determining that the expectation information is not consistent with the information concerning the frame.

3. The frame buffer monitoring method as claimed in claim 1, wherein the generating includes discarding the frame when determining that the expectation information is not consistent with the information concerning the frame.

4. The frame buffer monitoring method as claimed in claim 1, wherein the generating includes initializing a write destination address and a read source address of the frame buffer when determining that the expectation information is not consistent with the information concerning the frame.

5. The frame buffer monitoring method as claimed in claim 1, wherein the information concerning the frame comprises frame length information of the frame.

6. The frame buffer monitoring method as claimed in claim 1, wherein the extracting includes dividing the frame into a plurality of part frames, and extracting information concerning each of the part frames to be added to a start of each of the part frames.

7. The frame buffer monitoring method as claimed in claim 6, wherein the information concerning the frame is composed of frame length information of the frame, frame length information of each of the part frames, and a serial number indicating a connection order of each of the part frames.

8. The frame buffer monitoring method as claimed in claim 6, wherein the information concerning the frame is composed of frame length information of the frame, part number information when the part frames are equally divided, and a serial number indicating a connection order of the part frames.

9. A frame buffer monitoring method comprising:
   extracting start of packet (SOP) information and end of packet (EOP) information respectively indicating a start and an end of a received frame as information concerning the frame and adding the SOP and EOP information concerning the frame to the start of the frame, the frame being a variable-length packet;
   generating and transmitting SOP and EOP signals including the SOP and EOP information independently of the frame;
   writing the frame and the SOP and EOP signals in a frame buffer;
   reading the frame and the SOP and EOP signals from the frame buffer; and
   generating expectation SOP and EOP signals from the SOP and EOP information, and comparing positions or timing of the expectation SOP and EOP signals with the SOP and EOP signals transmitted at the generating to determine whether or not the expectation SOP and EOP signals are consistent with the SOP and EOP signals.

10. A frame buffer monitoring device comprising:
    a first means extracting start of packet (SOP) information and end of packet (EOP) information concerning a received frame and adding the SOP and EOP information concerning the frame to a start of the frame, the frame being a variable-length packet;
    a second means writing the frame added with the SOP and EOP information concerning the frame obtained by the first means in a frame buffer;
    a third means reading the frame from the frame buffer and of generating SOP and EOP signals concerning the frame from the frame read; and
    a fourth means generating expectation SOP and EOP signals from the SOP and EOP information concerning the frame extracted, and comparing positions or timings of the expectation SOP and EOP signals with the SOP and EOP signals generated by the third means to determine whether or not the expectation SOP and EOP signals are consistent with the SOP and EOP.

11. The frame buffer monitoring device as claimed in claim 10, wherein the fourth means includes a means setting a predetermined identifier within the frame invalid when determining that the expectation information is not consistent with the information concerning the frame.

12. The frame buffer monitoring device as claimed in claim 10, wherein the fourth means includes a means discarding the frame when determining that the expectation information is not consistent with the information concerning the frame.

13. The frame buffer monitoring device as claimed in claim 10, wherein the fourth means includes a means initializing a write destination address and a read source address of the frame buffer when determining that the expectation information is not consistent with the information concerning the frame.

14. The frame buffer monitoring device as claimed in claim 10, wherein the information concerning the frame comprises frame length information of the frame.

15. The frame buffer monitoring device as claimed in claim 10, wherein the first means includes a means dividing the frame into a plurality of part frames, and extracting information concerning each of the part frames to be added to a start of each of the part frames.

16. The frame buffer monitoring device as claimed in claim 15, wherein the information concerning the frame is composed of frame length information of the frame, frame length information of each of the part frames, and a serial number indicating a connection order of each of the part frames.

17. The frame buffer monitoring device as claimed in claim 15, wherein the information concerning the frame is composed of frame length information of the frame, part number information when the part frames are equally divided, and a serial number indicating a connection order of the part frames.

18. A frame buffer monitoring device comprising:
 a first means extracting start of packet (SOP) information and end of packet (EOP) information respectively indicating a start and an end of a received frame as information concerning the frame and of adding the SOP and EOP information concerning the frame to the start of the frame, the frame being a variable-length packet;
 a second means generating and transmitting SOP and EOP signals including the SOP and EOP information independently of the frame;
 a third means writing the frame and the SOP and EOP signals in a frame buffer;
 a fourth means reading the frame and SOP and EOP signals from the frame buffer; and
 a fifth means generating expectation SOP and EOP signals from the SOP and EOP information and comparing positions or timings of the expectation SOP and EOP signals with the SOP and EOP signals transmitted by the second means to determine whether or not the expectation SOP and EOP signals are consistent with the SOP and EOP signals.

* * * * *

UNITED STATES PATENT AND TRADEMARK OFFICE
CERTIFICATE OF CORRECTION

| | | |
|---|---|---|
| PATENT NO. | : 7,978,704 B2 | |
| APPLICATION NO. | : 11/443243 | |
| DATED | : July 12, 2011 | |
| INVENTOR(S) | : Shiuji Sakakura | |

It is certified that error appears in the above-identified patent and that said Letters Patent is hereby corrected as shown below:

Column 13, Line 31, In Claim 1, after "information" delete "added".

Column 14, Line 47, In Claim 10, delete "EOP." and insert -- EOP signals generated by the third means. --, therefor.

Signed and Sealed this
Sixth Day of September, 2011

David J. Kappos
*Director of the United States Patent and Trademark Office*